(12) United States Patent
Kerckhaert

(10) Patent No.: US 6,729,411 B2
(45) Date of Patent: May 4, 2004

(54) HORSESHOE

(75) Inventor: Rudolf Karel Marie Kerckhaert, Sinaai (BE)

(73) Assignee: Kerckhaert B.V., Vogelwaard (NL)

( * ) Notice: Subject to any disclaimer, the term of this patent is extended or adjusted under 35 U.S.C. 154(b) by 0 days.

(21) Appl. No.: 10/235,831

(22) Filed: Sep. 6, 2002

(65) Prior Publication Data

US 2003/0062172 A1 Apr. 3, 2003

(30) Foreign Application Priority Data

Sep. 6, 2001 (NL) .............................. 1018900

(51) Int. Cl.[7] .................................. A01L 1/00
(52) U.S. Cl. ......................................... 168/4
(58) Field of Search ..................... 168/4, 6, 12, 13, 168/14, 24

(56) References Cited

U.S. PATENT DOCUMENTS

| | | | | |
|---|---|---|---|---|
| 142,097 A | * | 8/1873 | Goodenough ................. | 168/4 |
| 561,217 A | * | 6/1896 | Freyne ........................... | 168/4 |
| 1,151,797 A | * | 8/1915 | Kent ............................. | 168/13 |
| 3,310,115 A | * | 3/1967 | Ward ............................ | 168/4 |
| 4,480,698 A | | 11/1984 | Reeves .......................... | 168/4 |
| 4,972,909 A | * | 11/1990 | Rose ............................. | 168/4 |
| 5,121,798 A | * | 6/1992 | Lindh .......................... | 168/12 |

FOREIGN PATENT DOCUMENTS

| AU | 65-139/80 | 6/1981 |
|---|---|---|
| DE | G-93 11 811.2 | 11/1993 |

* cited by examiner

Primary Examiner—Charles T. Jordan
Assistant Examiner—Elizabeth Shaw
(74) Attorney, Agent, or Firm—James Creighton Wray; Meera P. Narasimhan

(57) ABSTRACT

Improved horseshoe of the type substantially consisting of an element with legs (6–7), which either or not merge into each other, and whereby the upper surface (8) of which, which is intended for coming into contact with the hoof (2), is provided with unevennesses, such as grooves, ribs, protrusions or impressions, characterized in that at least one leg (6) or (7) is provided with a surface (17), (18), respectively, the surface structure of which differs from that of the remaining part (A) of said upper surface (8).

8 Claims, 3 Drawing Sheets

HORSESHOE

BACKGROUND OF THE INVENTION

1. Field of the Invention

The present invention relates to an improved horseshoe, more particularly a horsehoe, such as it is used for shoeing the hoofs of hoofed animals, amongst others, in order to prevent damaging the hoofs.

2. Discussion of the Related Art

It is known that such horseshoe mostly consists of a U-shaped or closed element which is attached under a hoof by means of nails.

It is also known that the surface of a horseshoe coming into contact with the hoof, often is made rough by providing it with unevennesses, for example, in the form of ribs, grooves or such, the purpose of which is to prevent any relative displacement between horseshoe and hoof.

It is also known that the hoofs of horses and similar animals comprise a so-called hoof mechanism which allows the rear half of the hoof, when the leg is lifted, to narrow, whereas this rear part will expand when the horse or similar puts its leg down.

During this putting down of the leg, the rear part of the hoof not only expands, however, also will be displaced somewhat to the rear, as a consequence of which, so to speak, a displacement is caused which is directed inclined to the rear, towards each side of the hoof.

A badly functioning hoof mechanism hampers the blood circulation of the foot, as a result of which also the formation of a healthy, resilient horn shoe is prevented.

An enormous disadvantage of the horseshoes known up to now and discussed above, which are provided with a contact surface comprising unevennesses, is that said functioning of the so-called hoof mechanism is prevented to a major extent, in consideration of the fact that the unevennesses hamper the relative displacement of the hoof in respect to the horseshoe.

Consequently, the shock-absorbing function of the hoof mechanism is counteracted and the blood circulation of the underfoot is not optimum.

Due to the functioning of said hoof mechanism, in practice, however, still a displacement, albeit a small one, of the hoof in respect to the horseshoe will occur, and this more particularly at the location of the free extremities of the horseshoe, as a result of which the hoof, at those places, due to the roughness of the contact surface with the horseshoe, so to speak, will be somewhat abraded or damaged with each step.

Thus, on one hand, by known horseshoes, also at the location of the so-called hoof mechanism, a rather solid connection is formed between horseshoe and hoof, as a result of which the good and necessary movement of the natural hoof mechanism is counteracted, and, on the other hand, this hoof mechanism still will cause a tiny, local mutual displacement between hoof and horseshoe, with an undesired wear and tear of the hoof as a consequence thereof.

SUMMARY OF THE INVENTION

The present invention aims at providing a remedy for the aforementioned and other disadvantages.

More particularly, the invention aims at an improved horseshoe, which, as the known horseshoes, comprises a surface which is provided with unevennesses and which is connected to the hoof in such a manner that any relative displacement between hoof and horseshoe is avoided, but whereby, at the location where said hoof mechanism is acting, a relative displacement between the hoof and the horseshoe remains possible, such that at that location no abnormal wear and tear of the hoof will occur.

In order to allow this latter at the location of the hoof mechanism, to wit a displacement in respect to the horseshoe, one will provide the contact surface of the horseshoe with the hoof at the location of the hoof mechanism, more particularly at the location of at least one free extremity of the horseshoe, however, preferably at the location of both free extremities of the horseshoe, with unevennesses, for example, with ribs, grooves or such which are directed according to the direction of displacement of the hoof mechanism or, still better, one will provide a smooth part by which the displacement of the hoof mechanism will not be hindered in any manner.

An improved horseshoe according to the invention substantially consists of an element with legs which either or not merge into each other, the upper surface of which, which is intended for coming into contact with the hoof, is provided with unevennesses, such as grooves, ribs, protrusions or impressions, whereby at least one leg is provided with a part, the surface structure of which differs from that of the remaining part of said upper surface.

Of course, the transition from the rough part of said contact surface of the horseshoe towards the part which must allow the displacement of the hoof mechanism either or not will be gradually.

BRIEF DESCRIPTION OF THE DRAWINGS

With the intention of better showing the characteristics of the invention, hereafter, as an example without any limitative character, two preferred forms of embodiment of a horseshoe are described, with reference to the accompanying drawings, wherein.

DESCRIPTION OF THE PREFERRED EMBODIMENT

Figures 1, 2:
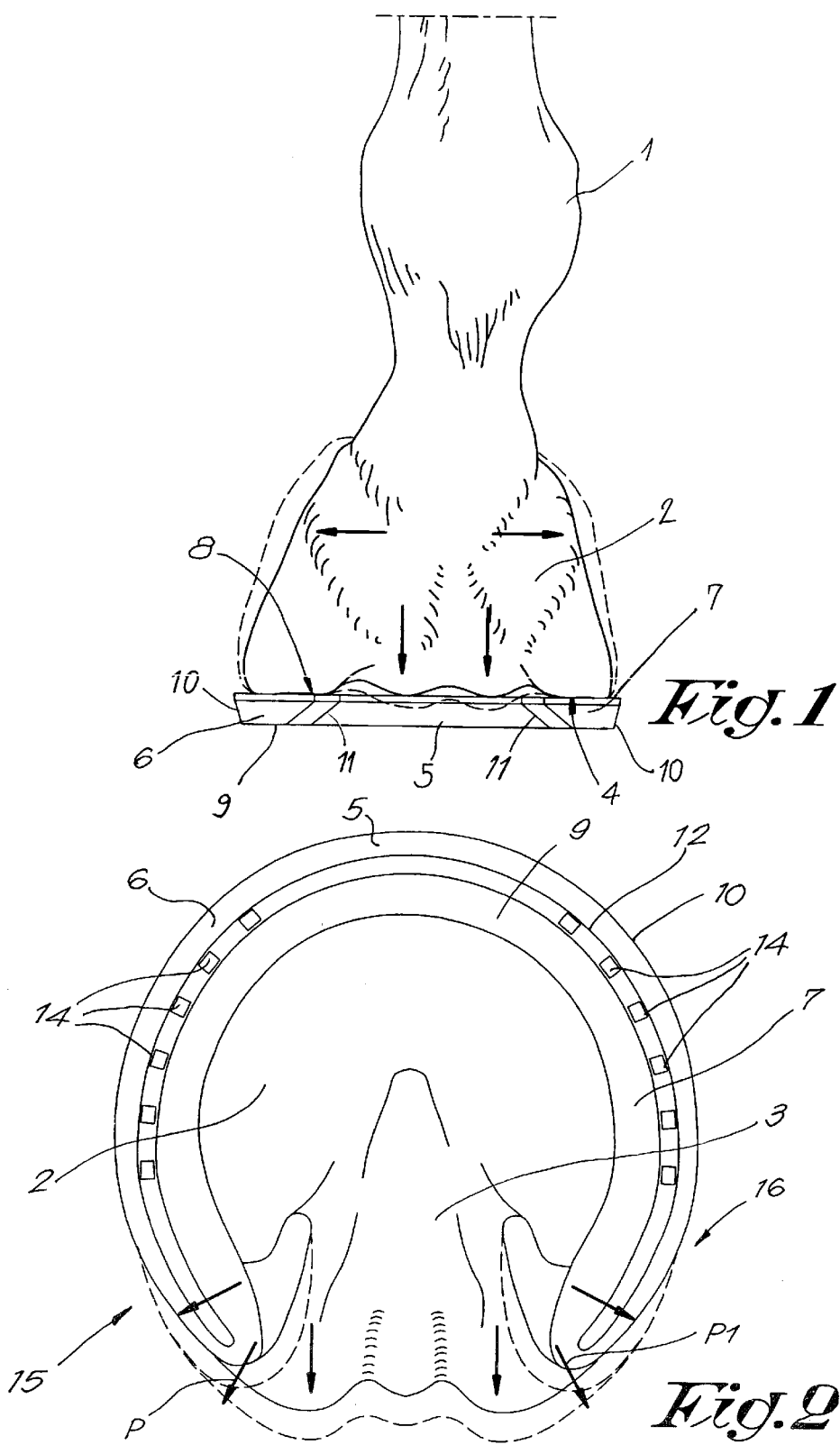
FIG. 1 represents a shoed leg of a hoofed animal.
FIG. 2 represents a bottom view of FIG. 1.

In FIGS. 1 and 2, a leg 1 with hoof 2 of a hoofed animal is represented, whereby the hoof mechanism is indicated by 3, and whereby a horseshoe 5 is attached to the sole 4 of the hoof 2, the circumference of which horseshoe 5, as known, follows the circumference of the sole 4.

Figure 3:
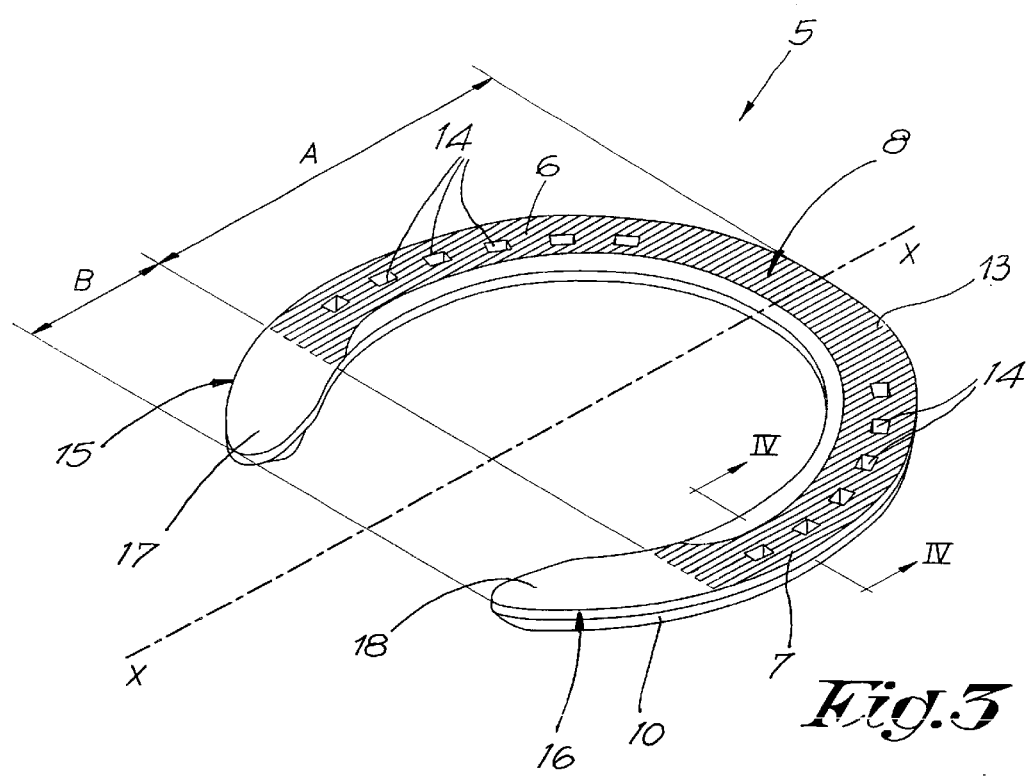
FIG. 3 in perspective represents a horseshoe according to the invention.

The improved horseshoe 5 according to the invention, as represented in FIG. 3, in this embodiment substantially consists of a U-shaped element, the legs 6 and 7 of which are situated at opposite sides of a symmetrical axis line X—X.

The upper surface 8 of the horseshoe 5 forms the contact surface with the sole 4 of a hoof 2.

Figure 4:
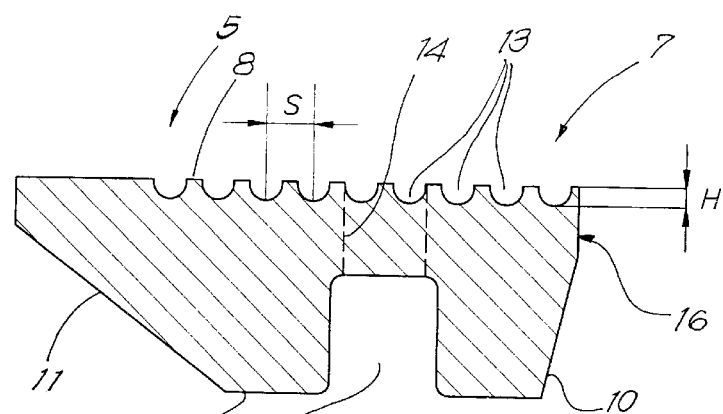
FIG. 4, at a larger scale, represents a cross-section according to line IV—IV in FIG. 3.
Figure 6:
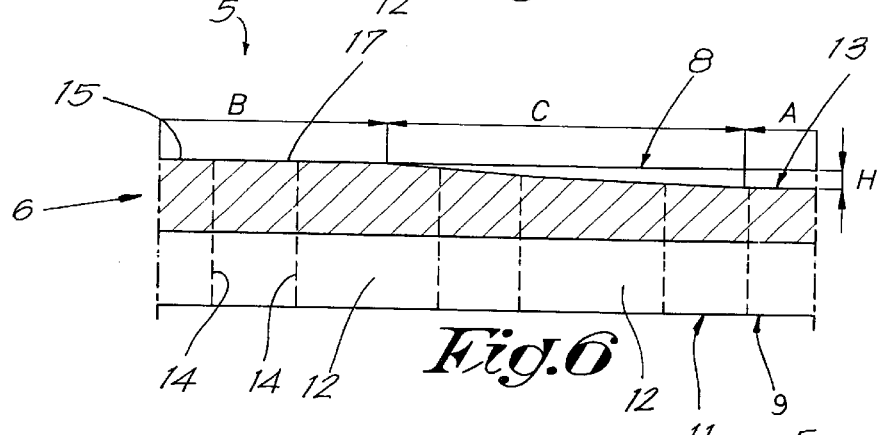
FIG. 6, at a larger scale, represents a cross-section according to line VI—VI in FIG. 5.

The improved horseshoe 5 as shown in FIG. 4 has bevelled edges 11 and 10 and further is provided with a continuous groove 12 in a surface 9 whereas the opposed surface 8 is provided with, in this cases, parallel grooves 13.

The aforementioned two surfaces 8 and 11 are connected to each other by openings 14 which give out into the groove 12.

According to the invention, said grooves 13 are directed parallel to said line X—X, whereby these grooves 13 are provided over a part A of the horseshoe.

Towards the extremities, 15, 16, respectively, of the legs 6 and 7 of the horseshoe 5, in this case, over a part B, a surface, 17, 18, respectively, is provided, which is realized entirely smooth.

The grooves 13 in said part A have a constant depth H over their entire length.

This depth H of the grooves 13 preferably will be 0.3 mm, whereas the core distance S between two adjacent grooves 13 will be approximately 1 millimeter.

Of course, the depth H of the grooves 13, as well as the distance S between two grooves 13 may be given any other value.

Although, in the example of FIG. 3, the surfaces 17 and 18 are realized entirely smooth, these surfaces possibly may show grooves or ribs which are directed according to the resulting line of the displacement direction of the contacting parts of said hoof mechanism, more particularly in the direction of the arrows P and P1 in FIG. 2.

Instead of grooves 13, also ribs may be provided, or any other unevennesses formed by protrusions or impressions.

Figure 5:
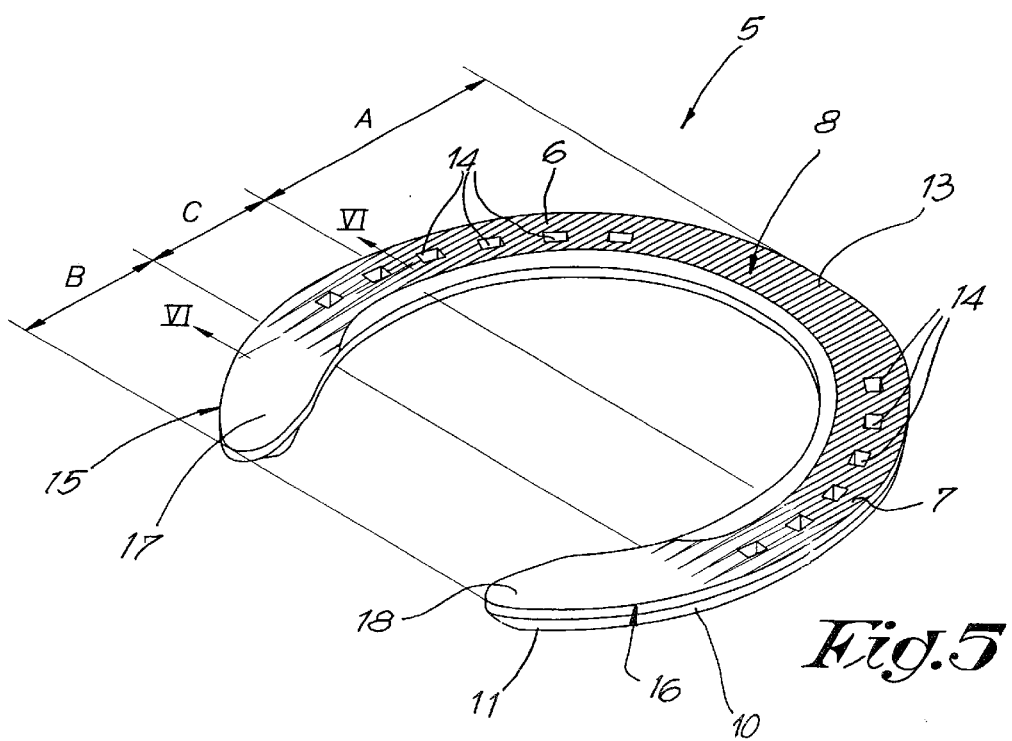
FIG. 5 represents a variant of the form of embodiment from FIG. 3.

Finally, the transition between said parts A and B can be brisk, however, preference will be given to have this transition run gradually, for example, over a distance C, as represented in FIG. 5.

A horseshoe 5 according to the invention is attached to a hoof 2 by means of nails, not represented in the figures, which, in a known manner, are provided through said openings 14, in such a manner that the heads of the nails are situated in the groove 12.

It is clear that the upper surface 8 in the part B at the extremities 15–16 does not have to be completely smooth. In fact, in certain cases these parts A and B possibly could be given a different surface structure, more particularly a surface structure which is less rough in part B than the roughness of part A, or whereby grooves are provided in part B which are directed according to said arrows P and PI, in order to allow for a lateral expansion of the hoof.

Figure 7:
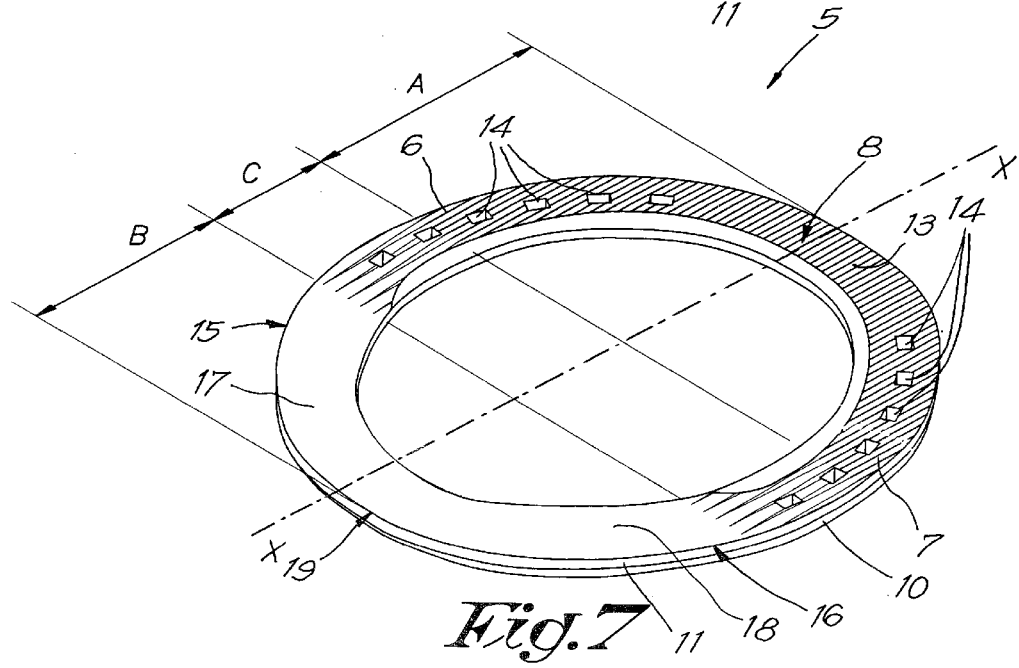
FIG. 7 is a perspective view similar to that from FIG. 5, however, for a closed horseshoe.

Further, in FIG. 7, a so-called closed horseshoe is represented, onto which the improvements according to the invention are applied.

In the same manner as described in the aforegoing for a U-shaped horseshoe, this closed horseshoe can be realized with ribs, grooves or such 13, whereby the legs 6 and 7 merge into each other in order to form a closed extremity 19.

In this case, also the aforementioned surfaces 17 and 18 merge into each other, such that the part B allows the hoof mechanism to function freely.

It is obvious that a horseshoe 5 according to the invention also can be provided with additional auxiliary elements, such as, for example, a toe clip, lateral clips or other elements.

The invention also is not limited exclusively to horseshoes 5, as described in the aforegoing, having, as in the represented embodiment variants, a symmetrical axis line X—X.

The present invention is in no way limited to the forms of embodiment described as an example and represented in the figures; on the contrary, such horseshoes can be realized according to different variants, without leaving the scope of the invention.

What is claimed is:

1. An improved horseshoe comprising a horseshoe of the type substantially having a rigid element with a rounded front and rearward extending legs, which either or nor merge into each other, and whereby an upper surface which is intended for coming into contact with a hoof, is provided with unevenness in the form of straight parallel grooves in toe to heel directions, wherein at least one leg is provided with a rearward upper surface, an upper surface structure of which differs from that of the remaining part of said upper surface.

2. The improved horseshoe according to claim 1, wherein both legs, at their extremities, are provided with a the rearward upper surface, the surface structure of which differs from that of the remaining part of said upper surface.

3. The improved horseshoe according to claim 1, wherein the surface structure at the location of one or of both surfaces at the extremities of the legs is less rough than that of the remaining part of said upper surface.

4. The improved horseshoe according to claim 1, wherein the surface structure of a surface at the extremity of a leg, is flat or smooth.

5. The improved horseshoe according to claim 1, wherein the transition of said unevenness, in the form of parallel grooves, towards a surface at the extremity of a leg, is gradual.

6. The improved horseshoe according to claim 1, wherein the surface structure of a surface at the extremity of a leg, is formed by angularly related grooves, which are directed rearward and outward according to the resulting line of the movements of the so-called hoof mechanism.

7. The horseshoe of claim 6, wherein the grooves are parallel to a symmetrical toe to heel axis line.

8. The horseshoe of claim 1, wherein the grooves, are concave, semi-cylindrical, about 0.3 mm deep on about 1 mm spaced center, protrusions, impressions, and combinations thereof.

* * * * *